(12) United States Patent
Utsumi et al.

(10) Patent No.: US 9,368,240 B2
(45) Date of Patent: Jun. 14, 2016

(54) CONTROL SYSTEM FOR NUCLEAR FACILITIES

(75) Inventors: Masafumi Utsumi, Tokyo (JP); Hidekazu Satake, Tokyo (JP); Masaru Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 540 days.

(21) Appl. No.: 13/813,472

(22) PCT Filed: Aug. 2, 2011

(86) PCT No.: PCT/JP2011/067684
§ 371 (c)(1),
(2), (4) Date: Jan. 31, 2013

(87) PCT Pub. No.: WO2012/018016
PCT Pub. Date: Feb. 9, 2012

(65) Prior Publication Data
US 2013/0129028 A1    May 23, 2013

(30) Foreign Application Priority Data
Aug. 6, 2010  (JP) .................................. 2010-178092

(51) Int. Cl.
*G21C 7/36*   (2006.01)
*G21D 3/04*   (2006.01)
(Continued)

(52) U.S. Cl.
CPC .. *G21D 3/04* (2013.01); *G21C 7/36* (2013.01); *G21C 17/00* (2013.01); *G21D 3/001* (2013.01); *G21D 3/06* (2013.01); *Y02E 30/39* (2013.01)

(58) Field of Classification Search
CPC ........... G21D 3/00; G21D 3/001; G21D 3/04; G21D 3/06; G21D 3/08; G21D 3/18
See application file for complete search history.

(56) References Cited

U.S. PATENT DOCUMENTS

| 2004/0136487 | A1* | 7/2004 | Shin ......................... G21D 3/04 |
| | | | 376/259 |
| 2007/0185700 | A1* | 8/2007 | Izumi ..................... G21C 17/00 |
| | | | 703/14 |
| 2010/0106264 | A1 | 4/2010 | Nishijima |

FOREIGN PATENT DOCUMENTS

| JP | 59-183396 A | 10/1984 |
| JP | 3-078696 A | 4/1991 |

(Continued)

OTHER PUBLICATIONS

Written Opinion of PCT/JP2011/067684, mailing date of Sep. 13, 2011.

(Continued)

*Primary Examiner* — Marshall O'Connor
(74) *Attorney, Agent, or Firm* — Westerman, Hattori, Daniels & Adrian, LLP

(57) ABSTRACT

Provided are a safety protection system facility 43 outputting a normal actuating signal S1 in a case where the safety protection system facility 43 controls actuation of a unit provided in a nuclear facility to a safe side based on an abnormality detecting signal output at the time of occurrence of an abnormality in the nuclear facility, and where this causes the unit to be actuated normally, and a CCF countermeasure facility 44 outputting a CCF-case actuating signal S2 actuating the unit to a safe side in a case where the CCF countermeasure facility 44 determines from output results of the abnormality detecting signal and the normal actuating signal S1 that the unit is not actuated normally at the time of occurrence of the abnormality in the nuclear facility.

6 Claims, 3 Drawing Sheets

(51) Int. Cl.
 *G21C 17/00* (2006.01)
 *G21D 3/00* (2006.01)
 *G21D 3/06* (2006.01)

(56) References Cited

FOREIGN PATENT DOCUMENTS

| JP | 4-299292 A | 10/1992 |
| JP | 5-209993 A | 8/1993 |
| JP | 2004-529353 A | 9/2004 |
| JP | 2005-195570 A | 7/2005 |

OTHER PUBLICATIONS

International Search Report for PCT/JP2011/067684, mailing date of Sep. 13, 2011.
Japanese Decision of a Patent Grant mailed Dec. 2, 2014, issued in corresponding JP Application No. 2010-178092 with English translation (4 pages).
English Translation of Written Opinion of PCT/JP2011/067684, mailing date Sep. 13, 2011.
Extended European Search Report dated Jan. 22, 2016, issued in counterpart European Patent Application No. 11814641.4 (7 pages).

* cited by examiner

FIG.3

| FUNCTION / EVENT | STOP | | COOL | | | | | CONFINE | | | |
|---|---|---|---|---|---|---|---|---|---|---|---|
| | NUCLEAR REACTOR TRIP | TURBINE TRIP | AUXILIARY FEED WATER | AUXILIARY FEED WATER ISOLATION | SAFETY INJECTION | MAIN STEAM RELIEF VALVE | PRESSURIZER RELIEF VALVE | MAIN FEED WATER ISOLATION | MAIN STEAM ISOLATION | CONTAINMENT VESSEL SPRAY | CONTAINMENT VESSEL ISOLATION |
| TRANSIENT EVENT | A | A | A | - | - | - | - | - | - | - | - |
| SGTR | A | - | C | C | C | B | B | A | C | - | - |
| MAIN STEAM PIPE RUPTURE | A | - | C | C | - | - | - | - | C | C | - |
| MAIN FEED WATER PIPE RUPTURE | A | - | A | B | - | - | - | - | - | C | - |
| SMALL RUPTURE LOCA | A | - | C | - | B | - | - | - | - | C | C |
| MIDDLE RUPTURE LOCA | - | - | - | - | - | - | - | - | - | C | C |
| LARGE RUPTURE LOCA | - | - | - | - | - | - | - | - | - | C | B |

CONTROL SYSTEM FOR NUCLEAR FACILITIES

FIELD

The present invention relates to a control system for nuclear facilities, in which an auxiliary control device provided in the nuclear facilities actuates units to a safe side when a main control device provided in the nuclear facilities cannot control actuation of the units to the safe side due to a problem such as a common cause failure.

BACKGROUND

Conventionally known is a reactor protection system in which, in a case where a nuclear facility is in an abnormal state of operation, a reactor trip and an engineered safety feature are actuated, in consideration of a common cause failure (common mode failure) on software(for example, refer to Patent Literature 1). This reactor protection system has two comparison logic processor modules, and the two comparison logic processor modules have different kinds of CPUs. One comparison logic processor module processes input data in a first processing order to output a trip state signal. The other comparison logic processor module processes input data in a second processing order, which is a reverse direction of the first processing order, to output a trip state signal. Accordingly, since the trip state signal can be output with the use of the other comparison logic processor module, which is different from the one comparison logic processor module, in this reactor protection system, this reactor protection system can exclude a common cause failure.

CITATION LIST

Patent Literature

Patent Literature 1: Japanese National Publication of International Patent Application No. 2004-529353

SUMMARY

Technical Problem

However, in a case where either one of the two comparison logic processor modules outputs a trip state signal by malfunction, the reactor protection system will shut down an operation of the nuclear reactor. Thus, when the operation of the nuclear reactor is shut down by malfunction, the nuclear facilities cannot be operated until the operation of the nuclear reactor is restored, and thus an operating rate of the nuclear facilities is lowered.

An object of the present invention is to provide a control system for nuclear facilities enabling to restrict lowering of an operating rate of the nuclear facilities caused by malfunction.

Solution to Problem

According to an aspect of the present invention, a control system for a nuclear facility includes: a detecting sensor provided in a nuclear facility and configured to output an abnormality detecting signal at the time of occurrence of an abnormality in the nuclear facility; a main control device for outputting a normal actuating signal when a unit is actuated normally in consequence of controlling the unit provided in the nuclear facility to a safe side based on the abnormality detecting signal; and an auxiliary control device, as an auxiliary of the main control device, for outputting an auxiliary actuating signal to actuate the unit to a safe side in a case where the auxiliary control device determines from output results of the abnormality detecting signal and the normal actuating signal that the unit is not actuated normally for the abnormality in the nuclear facility. The auxiliary control device includes: a NOT circuit connected to an output side of the main control device, and configured to invert input or no input of the normal actuating signal and output an inverted signal; and a first AND circuit configured to output the auxiliary actuating signal based on input or no input of the signal output from the NOT circuit and input or no input of the abnormality detecting signal.

With this configuration, in a state in which the main control device is actuated normally, when an abnormality detecting signal is input in the main control device and the auxiliary control device from the detecting sensor, the main control device controls actuation of the unit provided in the nuclear facility to a safe side based on the abnormality detecting signal. The main control device outputs a normal actuating signal in a case where the main control device controls actuation of the unit to the safe side, and where this causes the unit to be actuated normally. At this time, the normal actuating signal is input in the auxiliary control device but passes through the NOT circuit, and thus the signal is not input in the first AND circuit. Accordingly, even when the abnormality detecting signal is input in the first AND circuit, the auxiliary actuating signal is not output from the first AND circuit. Consequently, when an abnormality occurs in the nuclear facility in a state in which the main control device is actuated normally (for example, in a state in which no common cause failure occurs), the main control device outputs the normal actuating signal, and thus the auxiliary control device can prevent the auxiliary actuating signal from being output from the first AND circuit. On the other hand, in a state in which the main control device is in a malfunction state (for example, in a state in which a common cause failure occurs), when an abnormality detecting signal is input in the main control device and the auxiliary control device from the detecting sensor, there is a case in which the normal actuating signal is not output from the main control device. At this time, the normal actuating signal is not input in the auxiliary control device but passes through the NOT circuit, and thus the signal is input in the first AND circuit. Accordingly, since the first AND circuit receives the signal from the NOT circuit and the abnormality detecting signal, the first AND circuit can output the auxiliary actuating signal. Consequently, the auxiliary control device can output the auxiliary actuating signal from the first AND circuit even when the main control device malfunctions, and thus the unit provided in the nuclear facility can be actuated to the safe side.

Advantageously, in the control system for a nuclear facility, the auxiliary control device includes a delay circuit for delaying output of the abnormality detecting signal to the first AND circuit as much as predetermined time from reception of the abnormality detecting signal by the main control device to output of the normal actuating signal to the first AND circuit.

With this configuration, the delay circuit can delay output of the abnormality detecting signal to the first AND circuit as much as the predetermined time until input of the normal actuating signal via the NOT circuit in the first AND circuit. That is, when the normal actuating signal is not input via the NOT circuit in the first AND circuit, this brings about a state in which the signal output from the NOT circuit is input in the first AND circuit. When the abnormality detecting signal is input in this state, the auxiliary actuating signal will be output from the first AND circuit. Accordingly, by providing the delay circuit, the abnormality detecting signal is input after the normal actuating signal is input via the NOT circuit in the first AND circuit. Accordingly, the first AND circuit can perform output or no output of the auxiliary actuating signal only when necessary by detecting input or no input of the abnormality detecting signal after detecting input or no input of the signal output from the NOT circuit.

Advantageously, the control system for a nuclear facility further includes: a first manual manipulating unit configured to output an allowing signal allowing output of the auxiliary actuating signal by manual manipulation. The auxiliary control device further includes a second AND circuit configured to output the auxiliary actuating signal based on input or no input of the auxiliary actuating signal output from the first AND circuit and input or no input of the allowing signal.

With this configuration, when the allowing signal is input in the second AND circuit by manual manipulation of the first manual manipulating unit, the second AND circuit can be in a state in which the auxiliary actuating signal can be output. On the other hand, when the allowing signal is not input in the second AND circuit by manual manipulation of the first manual manipulating unit, the second AND circuit can be in a state in which the auxiliary actuating signal cannot be output. Accordingly, an operator can control output or no output of the auxiliary actuating signal easily by manually manipulating the first manual manipulating unit as needed.

Advantageously, the control system for a nuclear facility further includes: a second manual manipulating unit configured to output a manual actuating signal actuating the unit provided in the nuclear facility to a safe side by manual manipulation; and an OR circuit configured to output a second auxiliary actuating signal based on input or no input of the auxiliary actuating signal output from the second AND circuit and input or no input of the manual actuating signal.

With this configuration, when at least either the manual actuating signal or the auxiliary actuating signal is input in the OR circuit, the OR circuit can output the second auxiliary actuating signal. Accordingly, since the operator can output the second auxiliary actuating signal easily by manually manipulating the second manual manipulating unit as needed, the unit can be actuated to a safe side by manual manipulation.

Advantageously, in the control system for a nuclear facility, the nuclear facility includes a nuclear reactor having inside a core, a containment housing the nuclear reactor, and the unit. The unit includes a core damage preventing unit preventing damage of the core and a vessel breakage preventing unit preventing breakage of the containment, and the auxiliary control device outputs the auxiliary actuating signal to actuate the core damage preventing unit and the vessel breakage preventing unit to a safe side.

With this configuration, since the auxiliary control device has only to output the auxiliary actuating signal that actuates the core damage preventing unit to a safe side and the auxiliary actuating signal that actuates the vessel breakage preventing unit to a safe side, the auxiliary control device can be configured to the minimum and can thus be configured simply.

Advantageously, in the control system for a nuclear facility, the main control device includes a digital facility executing software on hardware, and the auxiliary control device is an analog facility configured by connecting respective junctions of electronic components by wires.

With this configuration, since the main control device and the auxiliary control device can be configured differently, occurrence of a common cause failure can be restricted. Accordingly, even in a case where a common cause failure occurs in the digital facility of the main control device, the auxiliary control device can actuate the unit provided in the nuclear facility to a safe side at the time of occurrence of an abnormality in the nuclear facility.

Advantageous Effects of Invention

With the control system for a nuclear facility according to the present invention, in a case where the main control device is actuated normally, the unit provided in the nuclear facility is not actuated by the auxiliary control device. On the other hand, in a case where the main control device malfunctions due to a common cause failure or the like, the unit provided in the nuclear facility can be actuated by the auxiliary control device as needed. Accordingly, at the time of occurrence of an abnormality in the nuclear facility, the unit provided in the nuclear facility can be actuated to a safe side suitably by the main control device and the auxiliary control device. Also, in a case where the main control device is actuated normally, the unit provided in the nuclear facility will not be actuated by malfunction of the auxiliary control device, and thus lowering of an operating rate of the nuclear facility caused by malfunction can be restricted.

BRIEF DESCRIPTION OF DRAWINGS

FIG. 3 is a table which relate possible abnormal events that may occur in a nuclear facility to kinds of a core damage preventing function and a vessel breakage preventing function to be performed in accordance with the possible abnormal events.

DESCRIPTION OF EMBODIMENTS

Hereinafter, a control system for a nuclear facility according to the present invention will be described with reference to the attached drawings. It is to be noted that the present invention is not limited to the following embodiments. Also, components in the following embodiments include ones that are replaceable and practiced easily by a person skilled in the art or substantially identical ones.

Embodiments

Figure 1:
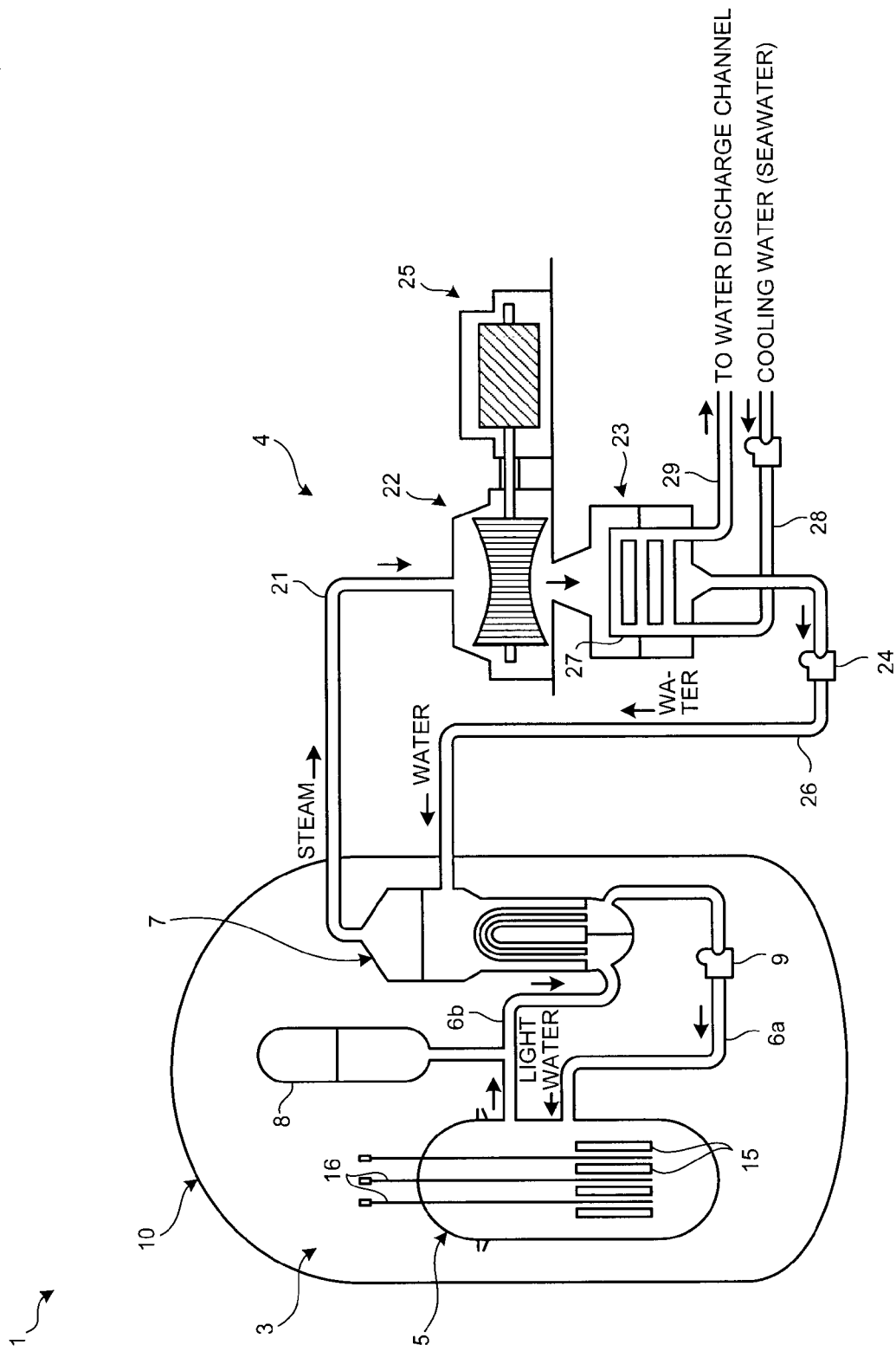
FIG. 1 is a schematic view illustrating a nuclear facility controlled by a control system according to an embodiment.

FIG. 1 is a schematic view illustrating a nuclear facility controlled by a control system according to the present embodiment. A control system 40 for a nuclear facility 1 according to the present invention is adapted to control the nuclear facility 1 including a nuclear reactor 5, and a pressurized water reactor (PWR) is used as the nuclear reactor 5, for example. The nuclear facility 1 using this pressurized water reactor 5 includes a nuclear reactor cooling system 3 including the nuclear reactor 5 and a turbine system 4 performing heat exchange with the nuclear reactor cooling system 3, and a nuclear reactor coolant circulates in the nuclear reactor cooling system 3 while a secondary coolant circulates in the turbine system 4.

The nuclear reactor cooling system 3 includes the nuclear reactor 5 and a steam generator 7 connected to the nuclear reactor 5 via coolant pipings 6a and 6b consisting of a cold leg 6a and a hot leg 6b. Also, a pressurizer 8 is interposed in the hot leg 6b while a coolant pump 9 is interposed in the cold leg 6a. The nuclear reactor 5, the coolant pipings 6a and 6b, the steam generator 7, the pressurizer 8, and the coolant pump 9 are housed in a containment 10.

The nuclear reactor 5 is a pressurized water reactor as described above and is filled therein with the nuclear reactor coolant. In the nuclear reactor 5, multiple fuel assemblies 15 are housed, and multiple control rods 16 controlling nuclear fission of the fuel assemblies 15 are provided to enable insertion into the respective fuel assemblies 15.

When the fuel assemblies 15 are subjected to nuclear fission while nuclear fission reactions are controlled by the control rods 16, heat energy is generated by this nuclear fission. The generated heat energy heats the nuclear reactor coolant, and the heated nuclear reactor coolant is sent to the steam generator 7 via the hot leg 6b. On the other hand, the nuclear reactor coolant sent from the steam generator 7 via the cold leg 6a flows in the nuclear reactor 5 and cools the inside of the nuclear reactor 5.

The pressurizer 8 interposed in the hot leg 6b pressurizes the nuclear reactor coolant heated to a high temperature to restrict boiling of the nuclear reactor coolant. Also, the steam generator 7 causes the high-temperature and high-pressure nuclear reactor coolant to undergo heat exchange with the secondary coolant to evaporate the secondary coolant to generate steam and cool the high-temperature and high-pressure nuclear reactor coolant. The coolant pump 9 circulates the nuclear reactor coolant in the nuclear reactor cooling system 3. The coolant pump 9 sends the nuclear reactor coolant from the steam generator 7 via the cold leg 6a to the nuclear reactor 5 and sends the nuclear reactor coolant from the nuclear reactor 5 via the hot leg 6b to the steam generator 7.

Here, a sequence of operations in the nuclear reactor cooling system 3 of the nuclear facility 1 will be described. When the nuclear reactor coolant is heated by heat energy generated by nuclear fission reactions in the nuclear reactor 5, the heated nuclear reactor coolant is sent to the steam generator 7 via the hot leg 6b by the coolant pump 9. The high-temperature nuclear reactor coolant passing through the hot leg 6b is pressurized by the pressurizer 8 to restrict boiling and flows in the steam generator 7 in a high-temperature and high-pressure state. The high-temperature and high-pressure nuclear reactor coolant flowing in the steam generator 7 is cooled by heat exchange with the secondary coolant, and the cooled nuclear reactor coolant is sent to the nuclear reactor 5 via the cold leg 6a by the coolant pump 9. The nuclear reactor 5 is cooled by the flow of the cooled nuclear reactor coolant in the nuclear reactor 5. That is, the nuclear reactor coolant circulates between the nuclear reactor 5 and the steam generator 7. Meanwhile, the nuclear reactor coolant is light water to be used as a coolant and a neutron moderator.

The turbine system 4 includes a turbine 22 connected to the steam generator 7 via a steam pipe 21, a condenser 23 connected to the turbine 22, and a feed water pump 24 interposed in a feed water pipe 26 connecting the condenser 23 to the steam generator 7. To the turbine 22 is connected a generator 25.

Here, a sequence of operations in the turbine system 4 of the nuclear facility 1 will be described. When steam flows in the turbine 22 via the steam pipe 21 from the steam generator 7, the turbine 22 is rotated. When the turbine 22 is rotated, the generator 25 connected to the turbine 22 generates electricity. Thereafter, steam flowing out of the turbine 22 flows in the condenser 23. The condenser 23 is provided therein with a cooling pipe 27, and one end of the cooling pipe 27 has connected to an intake pipe 28 taking cooling water (e.g., seawater) while the other end of the cooling pipe 27 has connected to a drain pipe 29 draining cooling water. The condenser 23 cools steam flowing from the turbine 22 by the cooling pipe 27 to turn the steam back to liquid. The secondary coolant as liquid is sent to the steam generator 7 via the feed water pipe 26 by the feed water pump 24. The secondary coolant sent to the steam generator 7 undergoes heat exchange with the nuclear reactor coolant in the steam generator 7 and becomes steam again.

Figure 2:
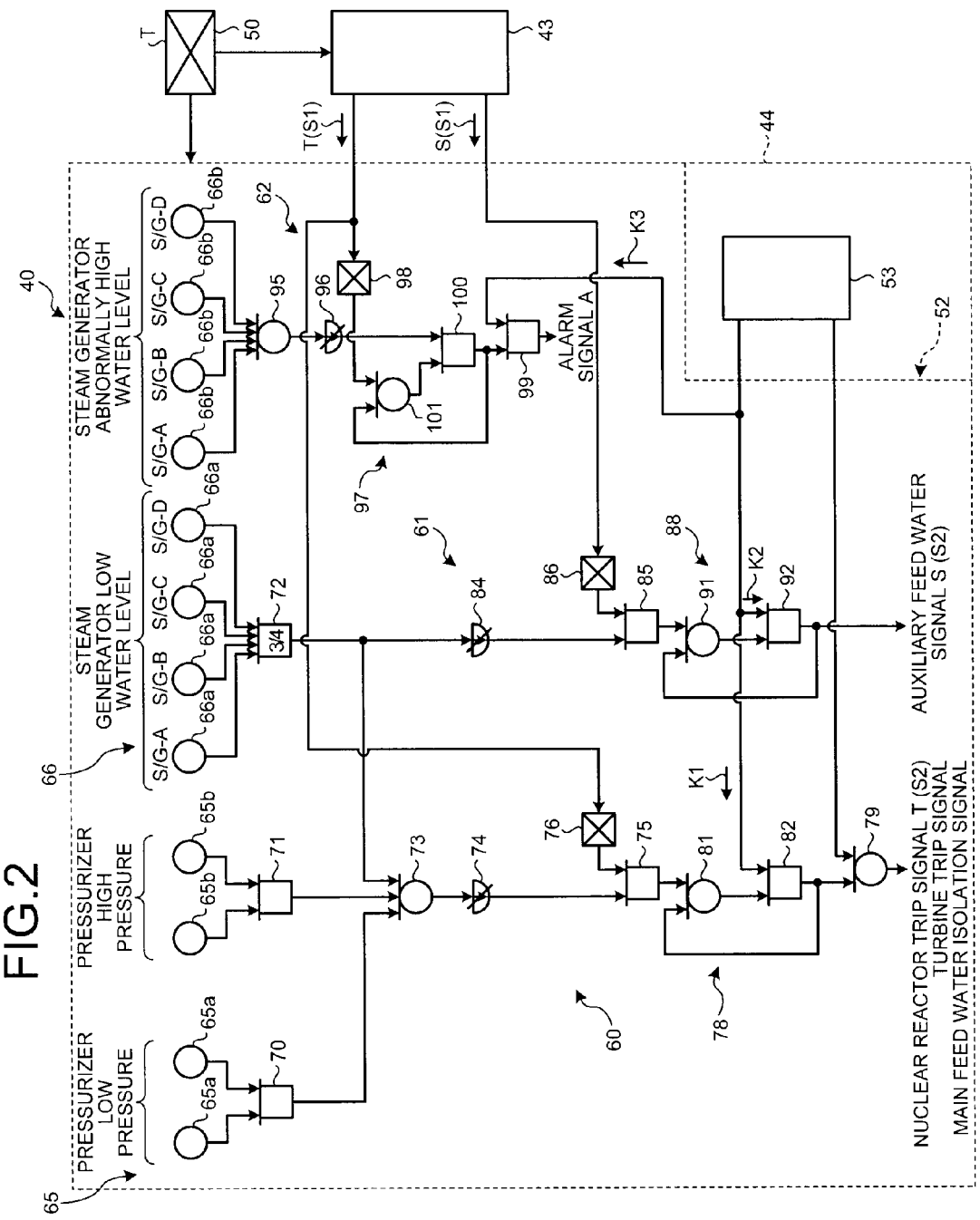
FIG. 2 is a configuration diagram of the control system for a nuclear facility according to the present embodiment.

FIG. 2 is a configuration diagram of a control system for a nuclear facility according to the present embodiment. The nuclear facility 1 configured as above is provided with the control system 40 controlling actuation of respective units such as the aforementioned various pumps and not illustrated valves provided in the nuclear facility 1. This control system 40 includes a not illustrated central control facility, a not illustrated plant control facility, a safety protection system facility (main control device) 43, and a CCF countermeasure facility (auxiliary control device) 44.

The central control facility is provided with a display unit displaying an operating state of the nuclear facility 1, a manipulating unit manipulating the nuclear facility 1, and the like, although these are not illustrated in figures. An operator operating the nuclear facility 1 visually recognizes the display unit to understand the operating state of the nuclear facility 1 and manipulates the manipulating unit as needed to operate the nuclear facility 1. The plant control facility controls operations of the nuclear reactor 5 and the respective units of the nuclear facility 1 based on a manipulating signal output from the manipulating unit of the central control facility.

As illustrated in FIG. 2, the safety protection system facility 43 takes control so that the nuclear facility 1 may be shut down safely in a case where an abnormality occurs in the nuclear facility 1. The CCF countermeasure facility 44 is a backup facility assisting the safety protection system facility 43 and takes control so that the nuclear facility 1 may be shut down safely in a case where a problem such as a common cause failure (CCF) occurs in the safety protection system facility 43.

The safety protection system facility 43 includes a plurality of control panels, some of the plurality of control panels are digital facilities in which computing units such as CPUs are built, and the digital facilities are facilities that can control safety protection systems of the nuclear facility 1 by executing various programs by the computing units. Meanwhile, the safety protection systems are functional systems functioning as stopping nuclear reactions of the nuclear reactor 5, cooling the nuclear facility 1, and preventing leakage of radioactive materials from the nuclear facility 1. The safety protection system facility 43 has high operational guarantee so as to be actuated reliably and be actuated even under a severe environment.

To the safety protection system facility 43 are connected various detecting sensors 50 disposed in the nuclear facility 1, and the safety protection system facility 43 determines whether or not an abnormality occurs in the nuclear facility 1 based on an abnormality detecting signal obtained from each detecting sensor 50. In a case where the safety protection system facility 43 determines that an abnormality occurs in the nuclear facility 1, the safety protection system facility 43 outputs to each unit an actuating signal actuating the unit to a safe side and, in a case where the unit is actuated normally, outputs a normal actuating signal S1 to the CCF countermeasure facility 44. Here, the normal actuating signal S1 includes a nuclear reactor trip signal T for shutting down the nuclear reactor 5, an auxiliary feed water signal S for supplying the turbine 22 with the secondary coolant, and the like.

The CCF countermeasure facility 44 is provided on the assumption of a case in which a common cause failure occurs in the safety protection system facility 43. The CCF countermeasure facility 44 is an analog facility, uses electric circuit parts such as switches and relays, and is configured by connecting respective junctions by electric wires. Here, the common cause failure is an event in which software used in each digital facility is not executed due to a common cause such as a bug. That is, in the present embodiment, the safety protection system facility 43 is a digital facility while the CCF countermeasure facility 44 is an analog facility to exclude a possibility of simultaneous failures of the safety protection system facility 43 and the CCF countermeasure facility 44 due to a common cause failure.

To the CCF countermeasure facility 44 are connected the various detecting sensors 50 as well, and the CCF countermeasure facility 44 determines whether or not an abnormality occurs in the nuclear facility 1 based on an abnormality detecting signal obtained from each detecting sensor 50 in a similar manner to that of the safety protection system facility 43. In a case where the CCF countermeasure facility 44 determines that an abnormality occurs in the nuclear facility 1, the CCF countermeasure facility 44 outputs to each unit an auxiliary actuating signal S2 actuating the unit to a safe side. Meanwhile, the auxiliary actuating signal S2 includes a nuclear reactor trip signal T for shutting down the nuclear reactor 5, an auxiliary feed water signal S for supplying the turbine 22 with the secondary coolant, and the like, in a similar manner to that of the normal actuating signal S1.

Also, the CCF countermeasure facility 44 includes an automatic control panel 52 enabling the auxiliary actuating signal S2 to be output automatically and a manual manipulating panel 53 enabling the auxiliary actuating signal S2 to be output manually. The automatic control panel 52 outputs to each unit the auxiliary actuating signal S2 actuating the unit to a safe side in a case where the automatic control panel 52 determines that an abnormality occurs in the nuclear facility 1 based on an abnormality detecting signal obtained from the detecting sensor 50.

The manual manipulating panel 53 has a plurality of manipulating units (not illustrated) outputting various signals by manual manipulation. Examples of the plurality of manipulating units include a manipulating unit that enables the nuclear reactor trip signal T to be output and a manipulating unit that enables a trip allowing signal K1 that allows the automatic control panel 52, to output the nuclear reactor trip signal T, an auxiliary feed water allowing signal K2 that allows the automatic control panel 52 to output the auxiliary feed water signal S, and an alarm allowing signal K3 that allows the automatic control panel 52 to output an alarm.

The automatic control panel 52 has a plurality of actuating circuits outputting various signals based on input abnormality detecting signals. The plurality of actuating circuits include a nuclear reactor trip circuit 60 outputting the nuclear reactor trip signal T, an auxiliary feed water activating circuit 61 outputting the auxiliary feed water signal S, and an alarm circuit 62 outputting an alarm, for example. The automatic control panel 52 also has a pressurizer pressure bistable 65 obtaining an abnormality detecting signal output from the detecting sensor 50 detecting pressure of the pressurizer 8 and a steam generator water level bistable 66 obtaining an abnormality detecting signal output from the detecting sensor 50 detecting water level of the steam generator 7, and the actuating circuits 60, 61, and 62 are connected to the pressurizer pressure bistable 65 or the steam generator water level bistable 66.

The pressurizer pressure bistable 65 has low pressure bistables 65a and high pressure bistables 65b. The plurality of (2 in the present embodiment) low pressure bistables 65a are provided in accordance with the number of pressurizers 8 provided in the nuclear facility 1, and each low pressure bistable 65a outputs an abnormality detecting signal when a lower pressure value than a pre-set lowermost pressure value is obtained. The plurality of (2 in the present embodiment) high pressure bistables 65b are provided in accordance with the number of pressurizers 8 provided in the nuclear facility 1, and each high pressure bistable 65b outputs an abnormality detecting signal when a higher pressure value than a pre-set uppermost pressure value is obtained.

The steam generator water level bistable 66 has low water level bistables 66a and high water level bistables 66b. The plurality of (4 in the present embodiment) low water level bistables 66a are provided in accordance with the number of steam generators 7 provided in the nuclear facility 1, and each low water level bistable 66a outputs an abnormality detecting signal when obtaining a lower water level value than a pre-set lowermost water level value. The plurality of (4 in the present embodiment) high water level bistables 66b are provided in accordance with the number of steam generators 7 provided in the nuclear facility 1, and each high water level bistable 66b outputs an abnormality detecting signal when a higher water level value than a pre-set uppermost water level value is obtained.

The nuclear reactor trip circuit 60 has an AND circuit 70 connected to output sides of the low pressure bistables 65a, an AND circuit 71 connected to output sides of the high pressure bistables 65b, and a voting circuit 72 connected to output sides of the low water level bistables 66a. The nuclear reactor trip circuit 60 also has an OR circuit 73 connected to output sides of the AND circuit 70, the AND circuit 71, and the voting circuit 72, a delay circuit 74 connected to an output side of the OR circuit 73, a first AND circuit 75 connected to an output side of the delay circuit 74, and a NOT circuit 76 connected to an input side of the first AND circuit 75.

When the AND circuit 70 receives abnormality detecting signals from the two low pressure bistables 65a, the AND circuit 70 outputs the abnormality detecting signal to the OR circuit 73. On the other hand, the AND circuit 70 outputs no abnormality detecting signal in a case where at least either one out of the two low pressure bistables 65a does not output an abnormality detecting signal.

When the AND circuit 71 receives abnormality detecting signals from the two high pressure bistables 65b, the AND circuit 71 outputs the abnormality detecting signal to the OR circuit 73. On the other hand, the AND circuit 71 outputs no abnormality detecting signal in a case where at least either one out of the two high pressure bistables 65b does not output an abnormality detecting signal.

When the voting circuit 72 receives abnormality detecting signals from three low water level bistables 66a out of the four low water level bistables 66a, the voting circuit 72 outputs the abnormality detecting signal to the OR circuit 73. On the other hand, the voting circuit 72 outputs no abnormality detecting signal in a case where at least three low water level bistables 66a do not output abnormality detecting signals.

When the OR circuit 73 receives one or more abnormality detecting signals from at least one circuit out of the AND circuit 70, the AND circuit 71, and the voting circuit 72, the OR circuit 73 outputs the nuclear reactor trip signal T to the delay circuit 74.

The NOT circuit 76 is connected at an input side thereof to the safety protection system facility 43. The NOT circuit 76 inverts the nuclear reactor trip signal T output from the safety protection system facility 43 and outputs the inverted signal to the first AND circuit 75. That is, when the nuclear reactor trip signal T is output from the safety protection system facility 43, the NOT circuit 76 does not output the signal to the first AND circuit 75. On the other hand, when no nuclear reactor trip signal T is output from the safety protection system facility 43, the NOT circuit 76 outputs the signal to the first AND circuit 75.

When the first AND circuit 75 receives the signal from the NOT circuit 76 and receives the nuclear reactor trip signal T from the OR circuit 73, the first AND circuit 75 outputs the nuclear reactor trip signal T. On the other hand, the first AND circuit 75 outputs no nuclear reactor trip signal T when the NOT circuit 76 or the OR circuit 73 outputs no signal.

The delay circuit 74 delays the nuclear reactor trip signal T to be output from the OR circuit 73 to the first AND circuit 75 as much as delay time from input of the abnormality detecting signal in the safety protection system facility 43 to input of the nuclear reactor trip signal T in the first AND circuit 75 via the NOT circuit 76.

Also, the nuclear reactor trip circuit 60 has a latch circuit 78 connected to an output side of the first AND circuit 75 and an OR circuit 79 connected to an output side of the latch circuit 78. The latch circuit 78 has a latch OR circuit 81 connected to an output side of the first AND circuit 75 and a latch AND circuit (second AND circuit) 82 connected to an output side of the latch OR circuit 81.

To an input side of the latch AND circuit 82 is connected the manual manipulating panel 53, and when the trip allowing signal K1 is input from the manual manipulating panel 53, the latch AND circuit 82 is in a state in which the nuclear reactor trip signal T can be output. To an output side of the latch AND circuit 82 is connected an input side of the latch OR circuit 81, and as long as the trip allowing signal K1 is input in the latch AND circuit 82, the latch AND circuit 82 is in a state in which the nuclear reactor trip signal T can be output. On the other hand, when the trip allowing signal K1 is not input from the manual manipulating panel 53, the latch AND circuit 82 cannot output the nuclear reactor trip signal T.

To an input side of the OR circuit 79 is connected the manual manipulating panel 53, and when the nuclear reactor trip signal T is input from the manual manipulating panel 53, or when the nuclear reactor trip signal T is input from the latch circuit 78, the OR circuit 79 outputs the nuclear reactor trip signal T (second auxiliary actuating signal).

Meanwhile, the nuclear reactor trip circuit 60 also functions as a turbine trip circuit enabling a turbine trip signal for shutting down the turbine 22 to be output and functions as a feed water isolation circuit enabling a feed water isolation signal for isolating a coolant circulating in the feed water pipe 26 in the containment 10 from the outside to be output.

The auxiliary feed water activating circuit 61 has the aforementioned voting circuit 72, a delay circuit 84 connected to an output side of the voting circuit 72, a first AND circuit 85 connected to an output side of the delay circuit 84, and a NOT circuit 86 connected to an input side of the first AND circuit 85.

The voting circuit 72 is shared with the nuclear reactor trip circuit 60. When the voting circuit 72 receives abnormality detecting signals from three low water level bistables 66a out of the four low water level bistables 66a, the voting circuit 72 outputs the auxiliary feed water signal S to the first AND circuit 85. On the other hand, the voting circuit 72 outputs no auxiliary feed water signal S in a case where at least three low water level bistables 66a do not output abnormality detecting signals.

The NOT circuit 86 is connected at an input side thereof to the safety protection system facility 43. The NOT circuit 86 inverts the auxiliary feed water signal S output from the safety protection system facility 43 and outputs the inverted signal to the first AND circuit 85.

That is, when the auxiliary feed water signal S is output from the safety protection system facility 43, the NOT circuit 86 does not output the signal to the first AND circuit 85. On the other hand, when no auxiliary feed water signal S is output from the safety protection system facility 43, the NOT circuit 86 outputs the signal to the first AND circuit 85.

When the first AND circuit 85 receives the signal from the NOT circuit 86 and receives the auxiliary feed water signal S from the voting circuit 72, the first AND circuit 85 outputs the auxiliary feed water signal S. On the other hand, the first AND circuit 85 outputs no auxiliary feed water signal S when the NOT circuit 86 or the voting circuit 72 outputs no signal.

The delay circuit 84 delays the auxiliary feed water signal S to be output from the voting circuit 72 to the first AND circuit 85 as much as delay time from input of the abnormality detecting signal in the safety protection system facility 43 to input of the auxiliary feed water signal S in the first AND circuit 85 via the NOT circuit 86.

Also, the auxiliary feed water activating circuit 61 has a latch circuit 88 connected to an output side of the first AND circuit 85. The latch circuit 88 has a latch OR circuit 91 connected to an output side of the first AND circuit 85 and a latch AND circuit (second AND circuit) 92 connected to an output side of the latch OR circuit 91.

To an input side of the latch AND circuit 92 is connected the manual manipulating panel 53, and when the auxiliary feed water allowing signal K2 is input from the manual manipulating panel 53, the latch AND circuit 92 is in a state in which the auxiliary feed water signal S can be output. An output side of the latch AND circuit 92 is connected to an input side of the latch OR circuit 91, and as long as the auxiliary feed water allowing signal K2 is input in the latch AND circuit 92, the latch AND circuit 92 is in a state in which the auxiliary feed water signal S can be output. On the other hand, when the auxiliary feed water allowing signal K2 is not input from the manual manipulating panel 53, the latch AND circuit 92 cannot output the auxiliary feed water signal S.

The alarm circuit 62 has an OR circuit 95 connected to output sides of the high water level bistables 66b, a delay circuit 96 connected to an output side of the OR circuit 95, a latch circuit 97 connected to an output side of the delay circuit 96, a NOT circuit 98 connected to an input side of the latch circuit 97, and a second AND circuit 99 connected to an output side of the latch circuit 97.

When the OR circuit 95 receives one or more abnormality detecting signals from at least one high water level bistable 66b out of the four high water level bistables 66b, the OR circuit 95 outputs an alarm signal A to the delay circuit 96.

An input side of the NOT circuit 98 is connected to the safety protection system facility 43. The NOT circuit 98 inverts the nuclear reactor trip signal T output from the safety protection system facility 43 and outputs the inverted signal to the latch circuit 97. That is, when the nuclear reactor trip signal T is output from the safety protection system facility 43, the NOT circuit 98 does not output the signal to the latch circuit 97. On the other hand, when no nuclear reactor trip signal T is output from the safety protection system facility 43, the NOT circuit 98 outputs the signal to the latch circuit 97.

The latch circuit 97 has a latch AND circuit (first AND circuit) 100 connected to an output side of the delay circuit 96 and a latch OR circuit 101 connected to an input side of the latch AND circuit 100. An input side of the latch OR circuit 101 is connected to the NOT circuit 98, and when the signal is input from the NOT circuit 98, the latch OR circuit 101 outputs the signal to the latch AND circuit 100. Input sides of the latch AND circuit 100 are connected to an output side of the latch OR circuit 101 and an output side of the delay circuit 96. When the latch AND circuit 100 receives the signal from the latch OR circuit 101 and receives the alarm signal A from the delay circuit 96, the latch AND circuit 100 outputs the alarm signal A to the second AND circuit 99.

An input side of the second AND circuit 99 is connected to the manual manipulating panel 53, and when the alarm allowing signal K3 is input from the manual manipulating panel 53, the second AND circuit 99 outputs the alarm signal A.

The delay circuit 96 delays the alarm signal A to be output from the OR circuit 95 to the latch AND circuit 100 as much as delay time from input of the abnormality detecting signal in the safety protection system facility 43 to input of the signal in the latch AND circuit 100 via the NOT circuit 98 and the latch OR circuit 101.

Here, controlled targets of the safety protection system facility 43 and controlled targets of the CCF countermeasure facility 44 differ partially. Specifically, the controlled targets of the CCF countermeasure facility 44 are part of units preventing damage of a core of the nuclear reactor 5 and part of units preventing breakage of the containment 10 in the controlled targets of the safety protection system facility 43. That is, the CCF countermeasure facility 44 exerts a core damage preventing function preventing damage of the core and a vessel breakage preventing function preventing breakage of the vessel by outputting the auxiliary actuating signals S2 such as the nuclear reactor trip signal T and the auxiliary feed water signal S.

FIG. 3 is a table which relates possible abnormal events that may occur in a nuclear facility to kinds of the core damage preventing function and the vessel breakage preventing function to be performed in accordance with the possible abnormal events. As illustrated in this table, the possible abnormal events include a transient event for a temperature or pressure of the coolant, rupture of a heat transfer tube provided in the steam generator 7 (SGTR), rupture of the steam pipe 21, rupture of the feed water pipe 26, and loss of the coolant by rupture (LOCA). Also, kinds of the core damage preventing function and the vessel breakage preventing function can be classified into three functions roughly: a function of stopping the nuclear facility 1, a function of cooling the nuclear facility 1, and a function of confining in the nuclear facility 1.

The function of stopping the nuclear facility 1 includes a nuclear reactor trip function shutting down the nuclear reactor 5 and a turbine trip function shutting down the turbine 22. The function of cooling the nuclear facility 1 includes an auxiliary feed water function performing auxiliary feed water to the turbine system 4, an auxiliary feed water isolation function isolating auxiliary feed water supplied to the turbine system 4, a safety injection function injecting the coolant in the nuclear reactor cooling system 3, a function of letting out steam in the steam generator 7 of a main steam relief valve, and a function of letting out steam in the pressurizer 8 of a pressurizer relief valve. The function of confining in the nuclear facility 1 includes a main feed water isolation function isolating a coolant circulating in the feed water pipe 26 in the containment 10 from the outside, a main steam isolation function isolating a coolant circulating in the steam pipe 21 in the containment 10 from the outside, a containment vessel spray function spraying cooling water in the containment 10, and a containment vessel isolation function isolating the inside of the containment 10 from the outside.

As illustrated in FIG. 3, the kinds of functions are classified into ones performed by the automatic control panel 52 of the CCF countermeasure facility 44, ones performed by the manual manipulating panel 53 of the CCF countermeasure facility 44, and ones performed by manual manipulation of units at sites at which the units are installed in accordance with the abnormal events. Here, ones performed by the automatic control panel 52 are ones having high occurrence frequency of the abnormal events and requiring early performance and are specifically expressed as a symbol A illustrated in FIG. 3. Ones performed by the manual manipulating panel 53 are ones having high occurrence frequency of the abnormal events but requiring no hasty manipulation and are specifically expressed as a symbol B illustrated in FIG. 3. Ones performed by manual manipulation of units at installation sites are ones having low occurrence frequency of the abnormal events but having great influences by the abnormal events and requiring manual manipulation and are specifically expressed as a symbol C illustrated in FIG. 3.

With the above configuration, in a state in which the safety protection system facility 43 is actuated normally, when an abnormality detecting signal is input in the safety protection system facility 43 and the CCF countermeasure facility 44 from the detecting sensor 50, the safety protection system facility 43 outputs the normal actuating signal S1 in a case where the safety protection system facility 43 controls actuation of the respective units to a safe side, and where this causes the respective units to be actuated normally. At this time, the normal actuating signal S1 is input in the CCF countermeasure facility 44 but passes through the NOT circuit 76, 86, or 98, and thus the signal is not input in the first AND circuit 75, 85, or 100. Accordingly, even when the abnormality detecting signal is input in the first AND circuit 75, 85, or 100, the auxiliary actuating signal S2 is not output from the first AND circuit 75, 85, or 100. Consequently, when an abnormality occurs in the nuclear facility 1 in a state in which the safety protection system facility 43 is actuated normally, the safety protection system facility 43 outputs the normal actuating signal S1, and thus the CCF countermeasure facility 44 can prevent the auxiliary actuating signal S2 from being output from the first AND circuit 75, 85, or 100. On the other hand, in a state in which a CCF occurs in the safety protection system facility 43 as a digital facility (malfunction state), when an abnormality detecting signal is input in the safety protection system facility 43 and the CCF countermeasure facility 44 from the detecting sensor 50, there is a case in which the normal actuating signal S1 is not output from the safety protection system facility 43. At this time, the normal actuating signal S1 is not input in the CCF countermeasure facility 44 but passes through the NOT circuit 76, 86, or 98, and thus the signal is input in the first AND circuit 75, 85, or 100. Accordingly, when the CCF countermeasure facility 44 is actuated normally, and the abnormality detecting signal is input in the first AND circuit 75, 85, or 100, the first AND circuit 75, 85, or 100 receives the signal from the NOT circuit 76, 86, or 98 and the abnormality detecting signal, and thus the first AND circuit 75, 85, or 100 can output the auxiliary actuating signal S2. Consequently, in a case where the CCF countermeasure facility 44 is actuated normally, the CCF countermeasure facility 44 can output the auxiliary actuating signal S2 even when a CCF occurs in the safety protection system facility 43, and thus the units provided in the nuclear facility 1 can be actuated to the safe side.

Also, since the delay circuits 74, 84, and 96 are provided, the abnormality detecting signal is input after the normal actuating signal S1 is input via the NOT circuit 76, 86, or 98 in the first AND circuit 75, 85, or 100. Accordingly, the first AND circuit 75, 85, or 100 can perform output or no output of the auxiliary actuating signal S2 by detecting input or no input of the abnormality detecting signal after detecting input or no input of the signal output from the NOT circuit 76, 86, or 98.

Also, when the allowing signal K1, K2, or K3 is input in the second AND circuit 82, 92, or 99 by manual manipulation of the manual manipulating panel 53, the second AND circuit 82, 92, or 99 can be in a state in which the auxiliary actuating signal S2 can be output. On the other hand, when the allowing signal K1, K2, or K3 is not input in the second AND circuit 82, 92, or 99 by manual manipulation of the manual manipulating panel 53, the second AND circuit 82, 92, or 99 can be in a state in which the auxiliary actuating signal S2 cannot be output. Accordingly, an operator can control output or no output of the auxiliary actuating signal S2 easily by manually manipulating the manual manipulating panel 53 as needed.

Also, when the nuclear reactor trip signal T is input in the OR circuit 79 by manual manipulation of the manual manipulating panel 53, the OR circuit 79 can output the nuclear reactor trip signal T (second auxiliary actuating signal). Accordingly, since the operator can output the nuclear reactor trip signal T easily by manually manipulating the manual manipulating panel 53 as needed, the units can be actuated to a safe side by manual manipulation.

Also, since the CCF countermeasure facility 44 has only to output the auxiliary actuating signal S2 that actuates core damage preventing units to a safe side and the auxiliary actuating signal S2 that actuates vessel breakage preventing units to a safe side, the CCF countermeasure facility 44 can be configured to the minimum and can thus be configured simply.

Also, since the safety protection system facility 43 includes the digital facilities while the CCF countermeasure facility 44 is the analog facility, occurrence of a failure by a common cause can be restricted. Accordingly, even in a case where a CCF occurs in the safety protection system facility 43, the CCF countermeasure facility 44 is actuated normally, and thus the units provided in the nuclear facility 1 can be actuated to a safe side at the time of occurrence of an abnormality in the nuclear facility 1.

INDUSTRIAL APPLICABILITY

As described above, the control system for nuclear facilities according to the present invention is useful in nuclear facilities including a safety protection system facility and a CCF countermeasure facility and especially in a case where, at the time of occurrence of an abnormality, units provided in the nuclear facilities are activated to a safe side, and where, in a case where the safety protection system facility is actuated normally, the units are not activated to the safe side due to malfunction of the CCF countermeasure facility, thus to restrict lowering of an operating rate of the nuclear facilities.

REFERENCE SIGNS LIST 1 nuclear facility
3 nuclear reactor cooling system
4 turbine system
5 nuclear reactor
7 steam generator
8 pressurizer
10 containment
15 fuel assembly
16 control rod
22 turbine
25 generator
40 control system
43 safety protection system facility
44 CCF countermeasure facility
50 detecting sensor
52 automatic control panel
53 manual manipulating panel
60 nuclear reactor trip circuit
61 auxiliary feed water activating circuit
62 alarm circuit
74 delay circuit of the nuclear reactor trip circuit
75 first AND circuit of the nuclear reactor trip circuit
76 NOT circuit of the nuclear reactor trip circuit
78 latch circuit of the nuclear reactor trip circuit
84 delay circuit of the auxiliary feed water activating circuit
85 first AND circuit of the auxiliary feed water activating circuit
86 NOT circuit of the auxiliary feed water activating circuit
88 latch circuit of the auxiliary feed water activating circuit
96 delay circuit of the alarm circuit
97 latch circuit of the alarm circuit
98 NOT circuit of the alarm circuit
99 second AND circuit of the alarm circuit
S1 normal actuating signal
S2 auxiliary actuating signal
T nuclear reactor trip signal
S auxiliary feed water signal
A alarm signal
K1 trip allowing signal
K2 auxiliary feed water allowing signal
K3 alarm allowing signal

The invention claimed is:

1. A control system for a nuclear facility comprising:
a detecting sensor provided in a nuclear facility and configured to output an abnormality detecting signal at the time of occurrence of an abnormality in the nuclear facility;
a main control device including a programmable processor configured to output a normal actuating signal when a unit is actuated normally in consequence of controlling the unit provided in the nuclear facility to a safe side based on the abnormality detecting signal; and
an auxiliary control device, as an auxiliary of the main control device, configured to output an auxiliary actuating signal to actuate the unit to a safe side in a case where the auxiliary control device determines from output results of the abnormality detecting signal and the normal actuating signal that the unit is not actuated normally for the abnormality in the nuclear facility, wherein the auxiliary control device includes:
a NOT circuit connected to an output side of the main control device, and configured to output a signal when the normal actuating signal is not input, and not to output the signal when the normal actuating signal is input; and
a first AND circuit configured not to output the auxiliary actuating signal when at least one of the signal from the NOT circuit and the abnormality detecting signal is not input, and configured to output the auxiliary actuating signal when the signal from the NOT circuit and the abnormality detecting signal are input,
wherein the detecting sensor is connected to an input side of the first AND circuit via a delay circuit and the main control device is connected to another input side of the first AND circuit via the NOT circuit.

2. The control system for a nuclear facility according to claim 1, wherein the delay circuit is configured to delay output of the abnormality detecting signal to the first AND circuit as much as predetermined time from reception of the abnormality detecting signal by the main control device to output of the normal actuating signal to the first AND circuit.

3. The control system for a nuclear facility according to claim 1, further comprising:
a first manual manipulating unit configured to output an allowing signal allowing output of the auxiliary actuating signal by manual manipulation, wherein
the auxiliary control device further includes a second AND circuit configured to output the auxiliary actuating signal when the auxiliary actuating signal from the first AND circuit and the allowing signal are input, and not to output the auxiliary actuating signal when at least one of the auxiliary actuating signal from the first AND circuit and the allowing signal is not input.

4. The control system for a nuclear facility according to claim 3, further comprising:
a second manual manipulating unit configured to output a manual actuating signal actuating the unit provided in the nuclear facility to a safe side by manual manipulation, wherein
the auxiliary control device further includes an OR circuit configured to output a second auxiliary actuating signal when at least one of the auxiliary actuating signal output from the second AND circuit and the manual actuating signal is input, and not to output the second auxiliary actuating signal when the auxiliary actuating signal output from the second AND circuit and the manual actuating signal are not input.

5. The control system for a nuclear facility according to claim 1, wherein the nuclear facility includes a nuclear reactor having inside a core, a containment housing the nuclear reactor, and the unit,
wherein the unit includes a core damage preventing unit preventing damage of the core and a vessel breakage preventing unit preventing breakage of the containment, and
wherein the auxiliary control device outputs the auxiliary actuating signal to actuate the core damage preventing unit and the vessel breakage preventing unit to a safe side.

6. The control system for a nuclear facility according to claim 1, wherein the main control device includes a digital facility executing software on hardware, and
wherein the auxiliary control device is an analog facility configured by connecting respective junctions of electronic components by wires.

* * * * *